United States Patent [19]
Inage et al.

[11] Patent Number: 6,163,437
[45] Date of Patent: *Dec. 19, 2000

[54] MAGNETIC HEAD WITH SPIN VALVE EFFECT MAGNETORESISTIVE ELEMENT AND ITS MANUFACTURING METHOD

[75] Inventors: Kenji Inage; Toshiaki Maeda; Jun Shouji, all of Nagano; Koichi Terunuma, Tokyo; Masanori Sakai, Nagano, all of Japan

[73] Assignee: TDK Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/044,886

[22] Filed: Mar. 20, 1998

[30] Foreign Application Priority Data

Mar. 24, 1997 [JP] Japan ................................. 9-087218

[51] Int. Cl.$^7$ .................................. G11B 5/39; G11B 5/40
[52] U.S. Cl. ............................................ 360/128; 360/323
[58] Field of Search .................................. 360/113, 104, 360/103, 122, 137, 128, 323; 324/207.21

[56] References Cited

U.S. PATENT DOCUMENTS

| | | | |
|---|---|---|---|
| 5,206,590 | 4/1993 | Dieny et al. | 324/252 |
| 5,422,571 | 6/1995 | Gurney et al. | 324/252 |
| 5,465,186 | 11/1995 | Bajorek et al. | 360/113 |
| 5,491,605 | 2/1996 | Hughbanks et al. | 360/113 |
| 5,554,924 | 9/1996 | McMahon et al. | 323/229 |
| 5,558,944 | 9/1996 | Terunuma | 428/611 |
| 5,650,887 | 7/1997 | Dovek et al. | 360/75 |
| 5,748,412 | 5/1998 | Murdock et al. | 360/113 |
| 5,757,591 | 5/1998 | Carr et al. | 360/113 |
| 5,812,349 | 9/1998 | Shouji et al. | 360/110 |
| 5,903,415 | 5/1999 | Gill | 360/113 |
| 5,969,523 | 10/1999 | Chung et al. | 324/252 |

FOREIGN PATENT DOCUMENTS

| | | |
|---|---|---|
| 0 459 404 | 12/1991 | European Pat. Off. . |
| 0 651 375 | 5/1995 | European Pat. Off. . |
| 651375 | 5/1995 | European Pat. Off. . |
| 9-223304 | 8/1997 | Japan . |

OTHER PUBLICATIONS

Patent Abstracts of Japan, vol. 096, No. 006, Jun. 28, 1996, JP 08 045033, Feb. 16, 1996.
Patent Abstracts of Japan, vol. 095, No. 006, Jul. 31, 1995, JP 07 085422, Mar. 31, 1995.
Patent Abstracts of Japan, vol. 018, No. 379 (P–1771), Jul. 15, 1994, JP 06 103508, Apr. 15, 1994.
Patent Abstracts of Japan, vol. 018. No. 300 (P–1750), Jun. 8, 1994, JP 06 060338, Mar. 4, 1994.
Albert J. Wallash, et al., Journal of Applied Physics, vol. 81, No. 8, pp. 4921 to 4923, "Electrostatic Discharge Sensitivity of Giant Magnetoresistive Recording Heads", Apr. 15, 1997.

*Primary Examiner*—David L. Ometz
*Assistant Examiner*—Angel Castro
*Attorney, Agent, or Firm*—Oblon, Spivak, McClelland, Maier & Neustadt, P.C.

[57] ABSTRACT

A magnetic head with a spin valve effect MR element and a method of manufacturing the head. A plurality of spin valve effect MR elements on a substrate are formed, a plurality of pairs of lead conductors connected with the respective spin valve effect MR elements on the substrate are formed, and then a plurality of protection circuits of magnetization inversion connected between the respective pairs of lead conductors on the substrate are formed. Each of the protection circuits is constituted so as to turn on when it receives an energy with a level at which the pinned direction inversion in each of the spin valve effect MR elements occurs.

18 Claims, 11 Drawing Sheets

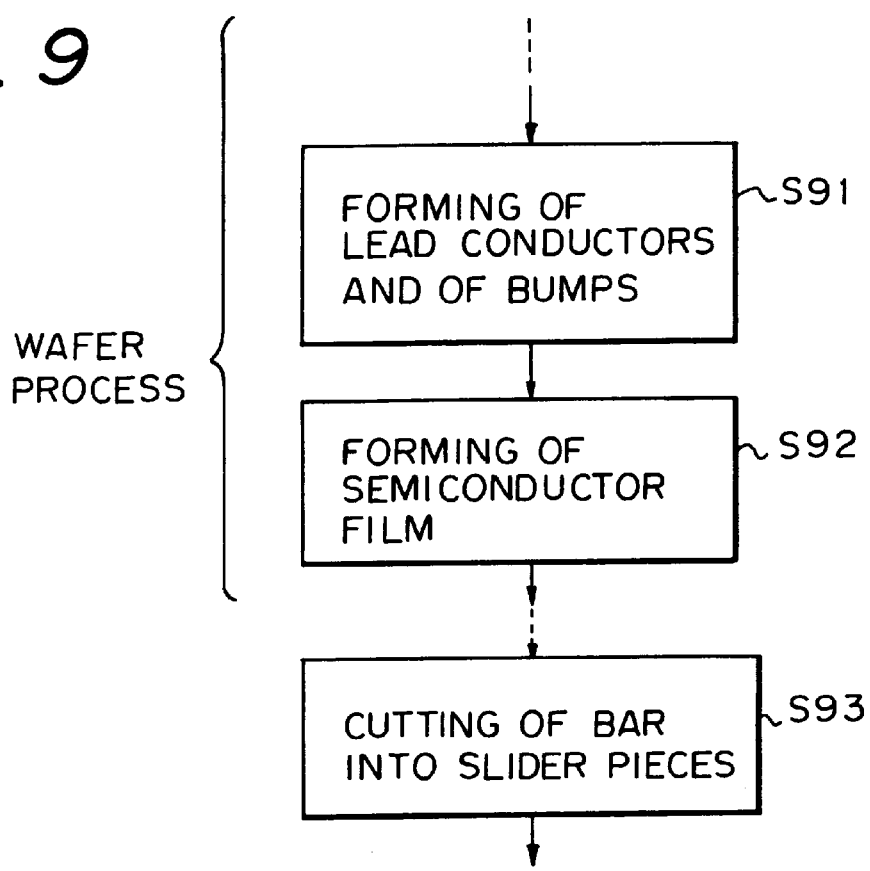
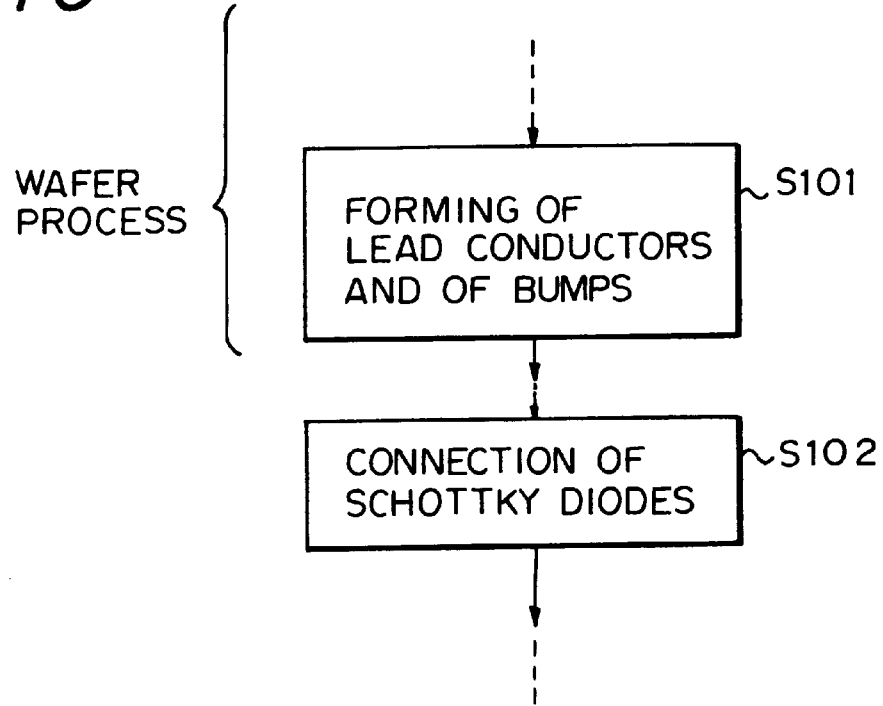

MAGNETIC HEAD WITH SPIN VALVE EFFECT MAGNETORESISTIVE ELEMENT AND ITS MANUFACTURING METHOD

FIELD OF THE INVENTION

The present invention relates to a magnetic head with a magnetoresistive (MR) element utilizing the spin valve effect and to a method of manufacturing the magnetic head.

DESCRIPTION OF THE RELATED ART

Due to the recent demand for higher density in a Hard Disk Device (HDD), it has been required to develop a high sensitive and high power output magnetic head. To serve the requirements, a magnetic head with a spin valve effect element which is one of elements providing the giant MR effect is provided (U.S. Pat. Nos. 5,206,590 and 5,422,571).

This spin valve effect element has a sandwiched structure with two ferromagnetic material thin-film layers separated by a non-magnetic metallic material thin-film layer. An antiferromagnetic material thin-film layer is deposited on and in contact with one of the two uncoupled ferromagnetic material thin-film layers so as to produce an exchange biasing magnetic field at their boundary and to apply the biasing magnetic field to this ferromagnetic material thin-film layer. Therefore, this one ferromagnetic material thin-film layer (pinned layer) receives the biasing magnetic field, whereas the other ferromagnetic material thin-film layer (free layer) receives no biasing magnetic field so that magnetization switching (inversion) is introduced by different magnetic field between the two ferromagnetic material thin-film layers. The magnetization directions of the two ferromagnetic material thin-film layers (pinned and free layers) therefore change between in parallel and in antiparallel with each other so that the electrical resistivity of this spin valve effect element greatly varies to obtain the large MR effects.

Output characteristics of this spin valve effect MR element are determined depending upon an angle between magnetization directions in the two ferromagnetic material thin-film layers (pinned and free layers). The magnetization direction in the free Layer is easily changed in response to the direction of magnetic field from a magnetic record medium, whereas the magnetization direction in the pinned layer is fixed to one direction (pinned direction) by means of the exchange coupling with the antiferromagnetic material thin-film layer.

However, when some electric charges are applied to the terminals of the MR element due to certain reason during manufacturing processes such as the wafer process of the magnetic heads and the mechanical working process, or during assembling processes of the completed heads to the HDD, the pinned direction of the spin valve effect MR element may be changed or inverted and thus various characteristics of the head may vary causing incorrect reproduction of the magnetically recorded signal. The change or inversion of the pinned direction may be caused by heat generated by the applied electric charges and magnetic field generated by the sense current.

As aforementioned, if the pinned direction changes, the angle between the magnetization directions in the pinned and free layers also changes causing the output characteristics to vary. Thus, it is very important in the magnetic head with the spin valve effect MR element to correctly maintain (fix) the pinned direction. Although various methods for preventing a MR head with a usual Anisotropic MR (AMR) element from the Electro-Static Discharge (ESD) destruction have been provided according to the conventional technique, there exists no idea or method for preventing the pinned direction inversion in the spin valve effect MR element.

SUMMARY OF THE INVENTION

It is therefore an object of the present invention to provide a magnetic head with a spin valve effect MR element and a method of manufacturing the head, whereby inversion of the pinned direction in the spin valve effect MR element can be effectively prevented.

According to the present invention, a method of manufacturing a magnetic head with a spin valve effect MR element including a step of forming a plurality of spin valve effect MR elements on a substrate, a step of forming a plurality of pairs of lead conductors connected with the respective spin valve effect MR elements on the substrate, and a step of forming a plurality of protection circuits of magnetization inversion connected between the respective pairs of lead conductors on the substrate, each of the protection circuits being constituted so as to turn on when it receives an energy with a level at which the pinned direction inversion in each of the spin valve effect MR elements occurs, and a method of manufacturing a magnetic head with a spin valve effect MR element including a step of forming a plurality of spin valve effect MR elements on a substrate, a step of forming a plurality of pairs of lead conductors connected with the respective spin valve effect MR elements on the substrate, and a step of connecting a plurality of discrete protection circuits of magnetization inversion between the respective pairs of lead conductors on the substrate, each of the discrete protection circuits being constituted so as to turn on when it receives an energy with a level at which the pinned direction inversion in each of the spin valve effect MR elements occurs are provided.

Since the protection circuit of magnetization inversion turns on when receiving an energy resulting in the pinned direction inversion in each of the spin valve effect MR elements and is connected between each of the pairs of lead conductors, the MR element itself can be prevented from introduction of electric charges which may cause the magnetization inversion. Therefore, inversion of the pinned direction caused by heat generated by the applied electric charges and magnetic field generated by the sense current can be effectively depressed.

Also, according to the present invention, a magnetic head with a spin valve effect MR element including a spin valve effect MR element, a pair of lead conductors connected with the spin valve effect MR element, and a protection circuit of magnetization inversion connected between the pair of lead conductors, the protection circuit being constituted so as to turn on when it receives an energy with a level at which the pinned direction inversion in the spin valve effect MR element occurs is provided.

It is preferred that an operating point for turning on of the protection circuit is defined at a energy level substantially the same or less than 3.0 nJ, more preferably defined at a energy level substantially equal to 2.55 nJ.

In modification, it is preferred that an operating point for turning on of the protection circuit is defined at a energy level substantially the same or less than 1.0 nJ, more preferably defined at a energy level substantially equal to 0.68 nJ.

It is also preferred that the protection circuit is constituted by a plurality of Schottky diodes.

Furthermore, according to the present invention, a method of manufacturing a magnetic head with a spin valve effect MR element including a step of forming a plurality of spin valve effect MR elements on a substrate, a step of forming a plurality of pairs of lead conductors connected with the respective spin valve effect MR elements on the substrate, a step of forming a plurality of short-circuit means for short-circuiting the respective pairs of lead conductors on the substrate, and a step of cutting the substrate to separate the spin valve effect MR elements into individual one and to break electrical connections of the short-circuit means with the respective pairs of lead conductors.

Since the short-circuit means is kept in connection until the cutting step in the manufacturing processes of the magnetic head is executed, the MR element itself can be prevented from introduction of electric charges which may cause the magnetization inversion. Therefore, inversion of the pinned direction caused by heat generated by the applied electric charges and magnetic field generated by the sense current can be effectively depressed until the cutting process.

Further objects and advantages of the present invention will be apparent from the following description of the preferred embodiments of the invention as illustrated in the accompanying drawings.

BRIEF DESCRIPTION OF THE DRAWINGS

FIG. 9 shows a flow chart schematically illustrating a part of manufacturing processes of the magnetic head of the embodiment shown in FIG. 3, particularly a part including a process for forming a protection circuit of magnetization inversion;

FIG. 10 shows a flow chart schematically illustrating a part of manufacturing processes of the magnetic head of a modification of the embodiment of FIG. 3, particularly a part including a process for forming a protection circuit of magnetization inversion;

DESCRIPTION OF THE PREFERRED EMBODIMENTS

Before illustrating the present invention based upon preferred embodiments, a fundamental structure and operations of the spin valve effect MR element related to the present invention will be described.

Figure 1:
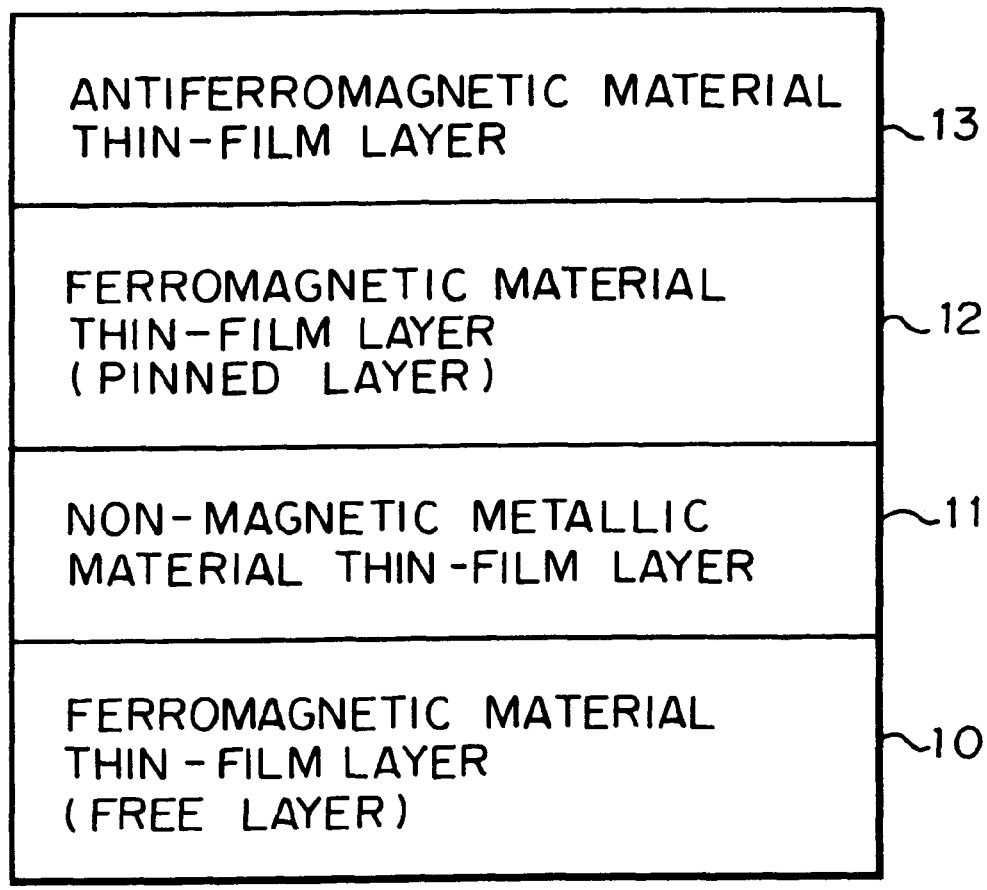
FIG. 1 shows a sectional view illustrating a fundamental structure of a spin valve multi-layered structure.

FIG. 1 illustrates the fundamental structure of a spin valve multi-layered structure. In the figure, reference numerals 10 and 12 denote two ferromagnetic material thin-film layers magnetically separated by a non-magnetic metallic material thin-film layer 11 to form a sandwiched structure. An antiferromagnetic material thin-film layer 13 is deposited on and in contact with the ferromagnetic material thin-film layer 12 so as to produce an exchange biasing magnetic field at their boundary and to apply it for pinning this ferromagnetic material thin-film layer (pinned layer) 12. The ferromagnetic material thin-film layer 10 is the free layer which receives no exchange biasing magnetic field.

Figure 2A:
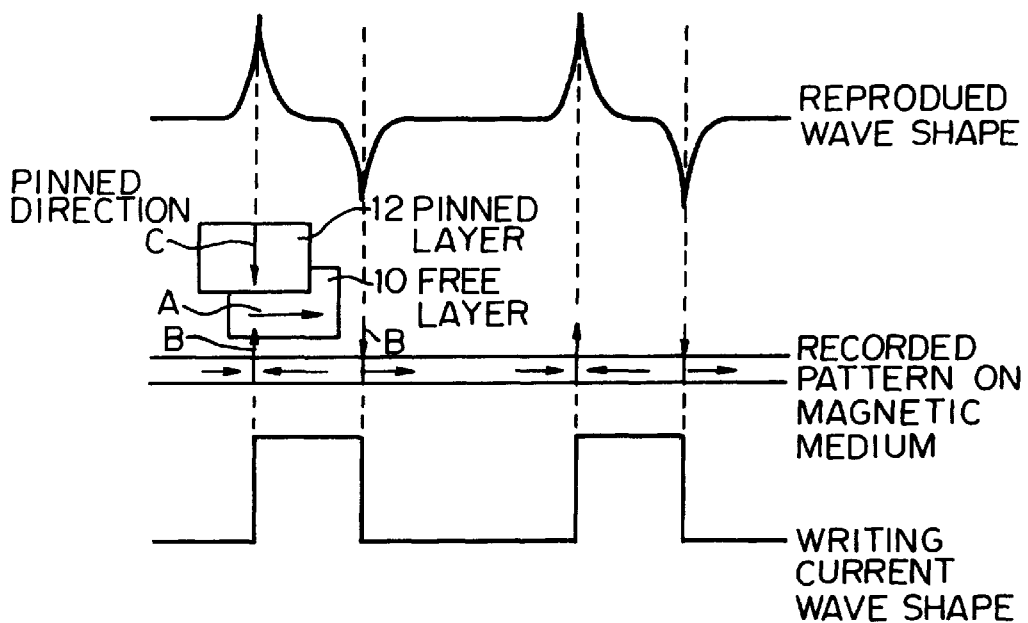
FIGS. 2a and 2b illustrate relationships between the pinned direction and reproduced wave shapes of the spin valve multi-layered structure.
Figure 2B:
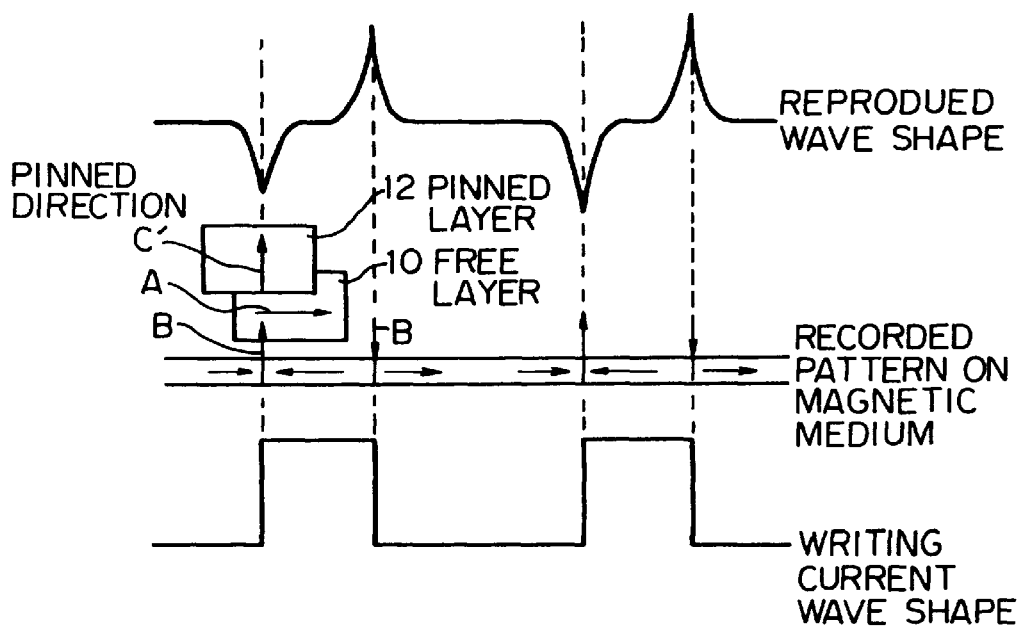

As shown in FIGS. 2a and 2b, the free layer 10 biased in the direction shown by an arrow A is magnetized in the upward and downward directions of leakage field generated in accordance with the recorded pattern on the magnetic record medium and thus reading operation is executed. The upward and downward directions are perpendicular to the magnetic medium and shown by arrows B. When the pinned direction of the pinned layer 12 is the direction of the arrow C as shown in FIG. 2a, the polarity of the reproduced wave shape will be alternated as positive, negative, positive and negative depending upon the recorded pattern shown in this figure if the sense current has positive polarity. Contrary to this, when the pinned direction of the pinned layer 12 is inverted or inverted to the direction of the arrow C' as shown in FIG. 2b, the polarity of the reproduced wave shape will be alternated as negative, positive, negative and positive depending upon the same recorded pattern. Thus, in the latter case, correct reproduction cannot be expected.

Figure 3:
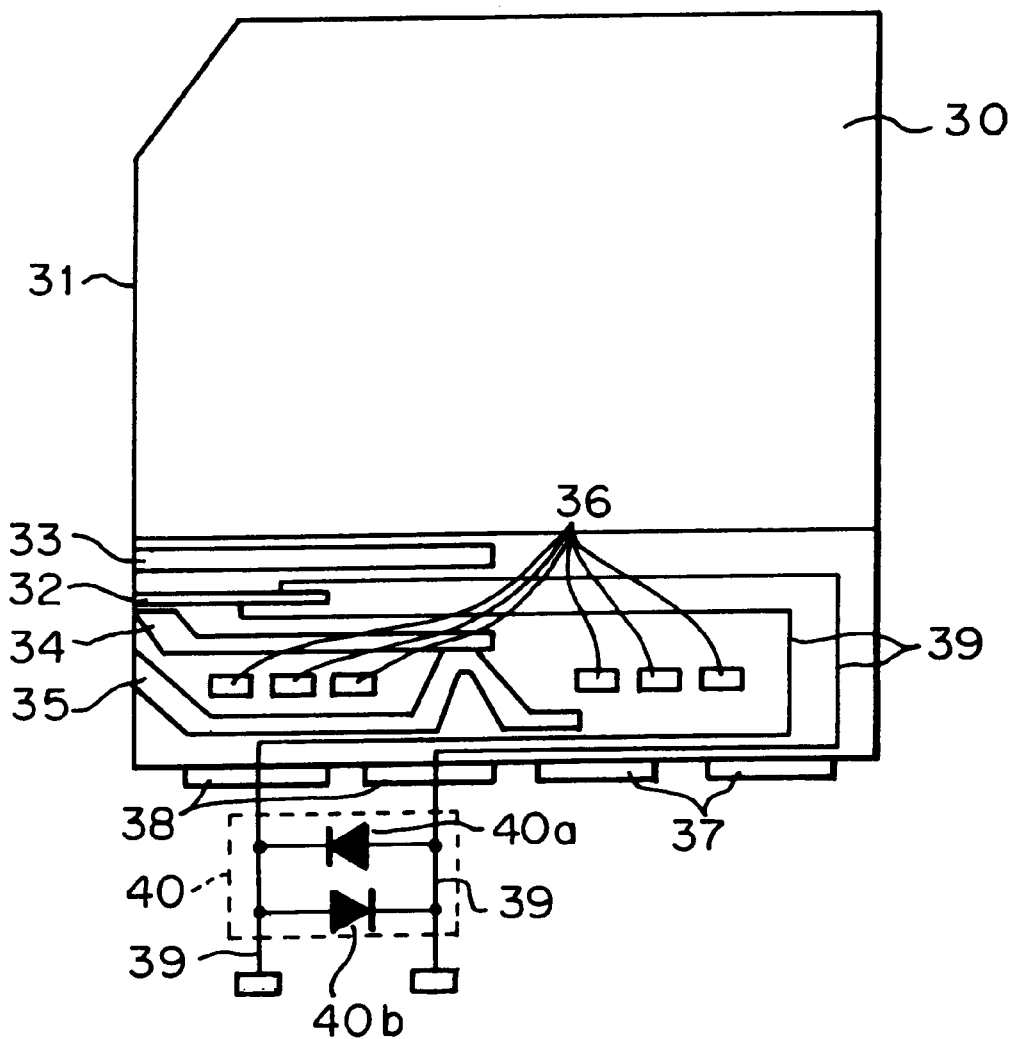
FIG. 3 shows a sectional view schematically illustrating a preferred embodiment of a complex magnetic head with a spin valve effect MR reading element and an inductive writing element according to the present invention.

FIG. 3 illustrates a preferred embodiment of a complex magnetic head with a spin valve effect MR reading element and an inductive writing element according to the present invention. In the figure, reference numeral 30 denotes a magnetic head slider, 31 denotes an Air Bearing Surface (ABS) of the slider 30, 32 denotes the spin valve effect MR reading element, 33 denotes a lower magnetic shield layer for the MR reading element 32, 34 denotes a first thin-film magnetic core layer of the inductive writing element and an upper magnetic shield layer for the MR element 32, 35 denotes a second thin-film magnetic core layer of the inductive element, 36 denotes a coil of the inductive writing element, 37 denotes a pair of terminal electrodes for the inductive writing element, 38 denotes a pair of terminal electrodes for the MR reading element 32, and 39 denotes a pair of lead conductors connected across the MR reading element 32 and also with the pair of the terminal electrodes 38, respectively. In addition, according to this embodiment, a protection circuit of magnetization inversion 40 constituted by two Schottky diodes 40a and 40b electrically connected in bidirectional between the pair of conductive leads 39 for the MR reading element 32 is provided.

The protection circuit 40 constituted by the Schottky diodes 40a and 40b turns on when an energy level applied thereto becomes equal to or more than a level which will cause the pinned direction of the spin valve MR reading element 32 to invert. In this embodiment, an operating point for turning on the protection circuit 40 is defined to an energy level equal to or less than about 1.0 nJ, preferably to a level of about 0.68 nJ.

The inventors of this application have found by experiment the relationship between the energy level applied to the spin valve effect MR element and its pinned direction inversion. The experiment is as follows.

Figure 4:
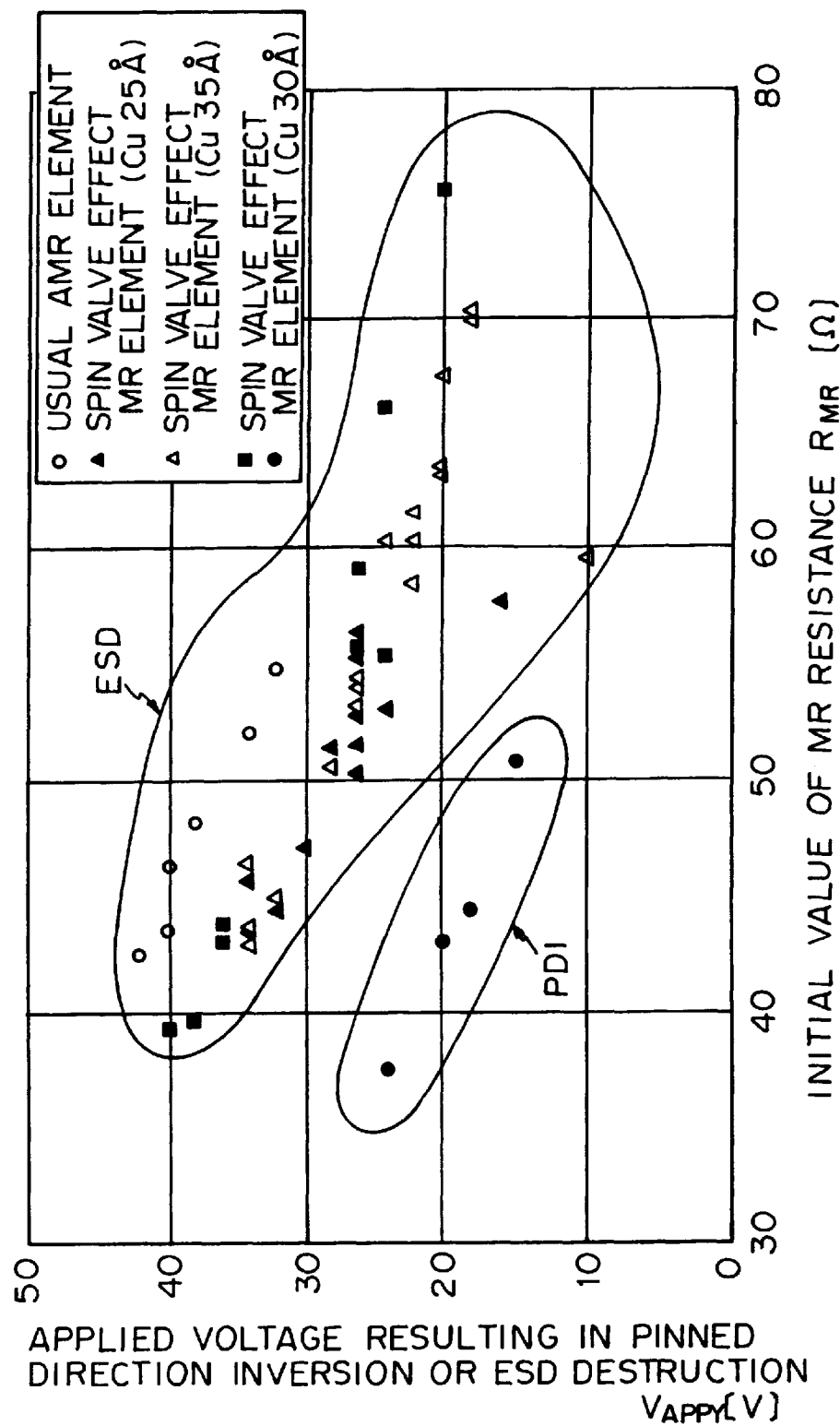
FIG. 4 illustrates ESD destruction voltages and pinned direction inversion voltages obtained by experiment with respect to samples of the spin valve effect MR reading element.

(A) Initial state of each sample of the spin valve effect MR element is measured by applying external alternating magnetic field with a constant amplitude and a sense current with a constant value by means of a ρ-H tester. (B) Then, the sample is attached to an ESD simulator after taking off it from the ρ-H tester, and a voltage of the against direction is applied from the ESD simulator to the sample. (C) Thereafter, the sample is taken off from the ESD simulator and attached to the ρ-H tester again. Then, characteristics of the sample after applying the voltage is measured by applying external alternating magnetic field with a constant amplitude and a sense current with a constant value by means of the ρ-H tester. (D) Thereafter, the above-mentioned processes of (B) and (C) are repeated by gradually increasing the applied voltage so as to detect an applied voltage level at which the pinned direction of the MR element is inverted for each sample. Reference symbol PDI (Pinned Direction Inversion) shown in FIG. 4 represents the detected points at which the pinned directions of the respective samples are inverted. In this figure, the axis of abscissas indicates the initial value of the MR resistance $R_{MR}$ [Ω] of each sample, and the axis of ordinates indicates the applied voltage $V_{APPY}$ [V] at which inversion of the pinned direction or ESD destruction will occur.

In the experiment, the external alternating magnetic field with a constant amplitude and the sense current of +4 mA in the against direction of the spin valve effect MR element were applied from the ρ-H tester. The voltage $V_{APPY}$ in the against direction of the spin valve effect MR element was applied from the ESD simulator which is a pseudo Human Body Model ($R_{SIMU}$=0.5 kΩ, C=100 pF). First, the voltage $V_{APPY}$ of 10 V was applied. Then, whether the pinned direction inversion occurs or not was detected by the ρ-H tester. If no inversion occurs, the voltage $V_{APPY}$ was increased by 2 V and then whether the pinned direction inversion occurs or not was detected again by the ρ-H tester. By repeating these manner, the voltage level at which the pinned direction of the spin valve effect MR element is inverted was obtained.

In the specification, an assist direction represents a direction that pinning toward the correct pinned direction is accelerated by the magnetic field generated by a current flowing through the spin valve effect MR element in this direction, and the against direction represents the opposite direction that the correct pinned direction is inverted by the magnetic field generated by a current flowing through the spin valve effect MR element in this direction.

During the above-mentioned experiment, ESD destruction voltages with respect to the samples of the spin valve effect MR element and the usual AMR element are detected by increasing the voltages applied to these samples. The result of this experiment is shown by ESD in FIG. 4.

With respect to a typical spin valve effect element with an initial $R_{MR}$ of 51.9 Ω, an applied energy level at which its pinned direction is inverted is measured by experiment as follows.

Figure 5:
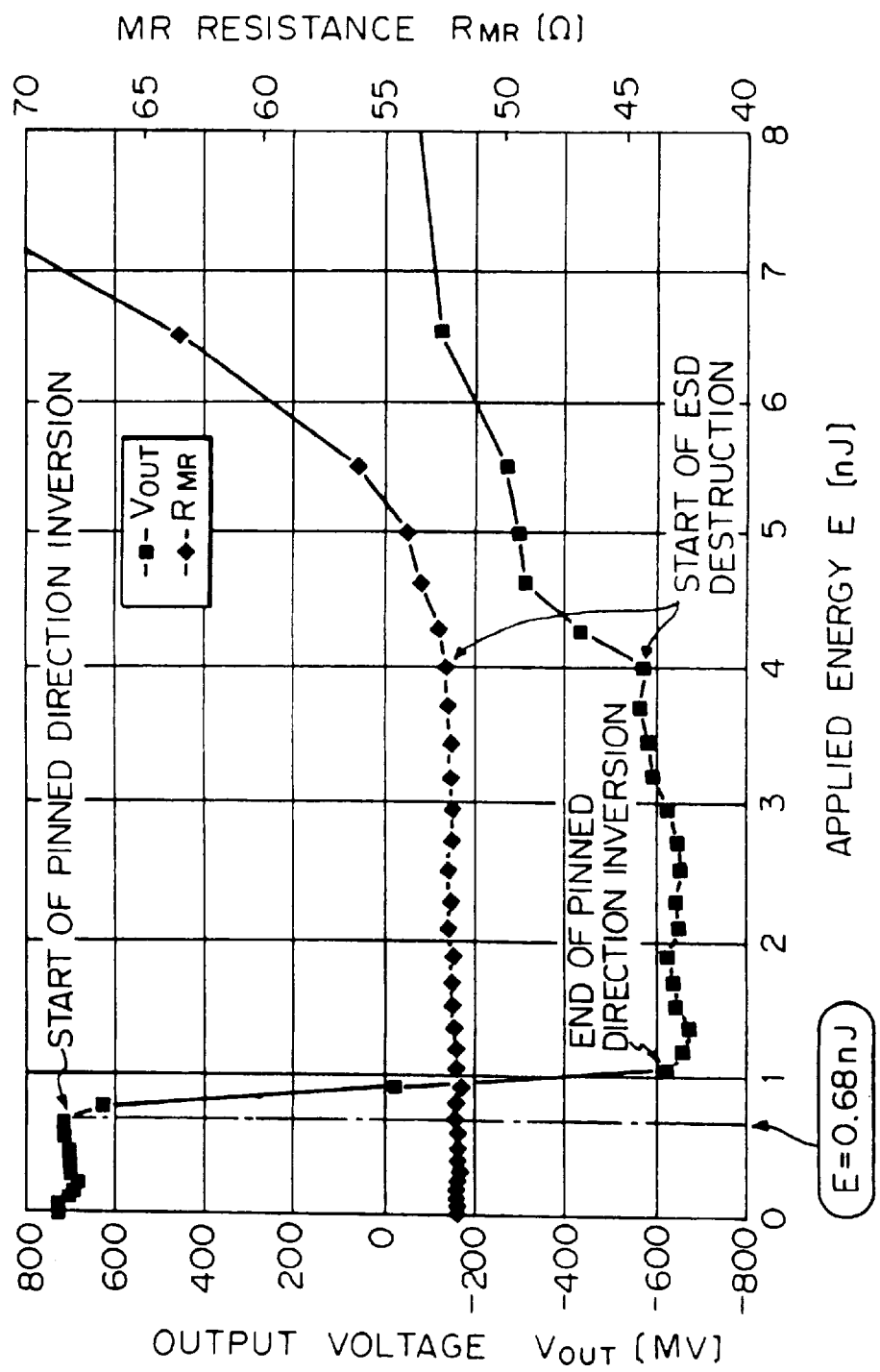
FIG. 5 illustrates an ESD destruction energy level and a pinned direction inversion energy level with respect to one spin valve effect MR reading element.

(a) Initial state of this spin valve effect MR element is measured by applying external alternating magnetic field with a constant amplitude and a sense current with a constant value by means of a ρ-H tester. (b) Then, the spin valve effect MR element is attached to an ESD simulator after taking off it from the ρ-H tester, and a voltage of the against direction is applied from the ESD simulator to the MR element. (c) Thereafter, the MR element is taken off from the ESD simulator and attached to the ρ-H tester again. Then, characteristics of the MR element after applying the voltage is measured by applying external alternating magnetic field with a constant amplitude and a sense current with a constant value by means of the ρ-H tester. (d) Thereafter, the above-mentioned processes of (b) and (c) are repeated with gradually increasing the applied voltage $V_{APPY}$ and with measuring the output voltage $V_{OUT}$ from the MR element. FIG. 5 shows the result of this experiment. In this figure, the axis of abscissas indicates the applied energy E [nJ] calculated by converting from the applied voltage $V_{APPY}$, and the axis of ordinates indicates the output voltage of the MR element $V_{OUT}$ [μV] and the MR resistance $R_{MR}$ [Ω].

In the experiment, the external alternating magnetic field with a constant amplitude and the sense current of +4 mA in the against direction of the spin valve effect MR element were applied from the ρ-H tester. The voltage $V_{APPY}$ in the against direction of the spin valve effect MR element was applied from the ESD simulator which is a pseudo Human Body Model ($R_{SIMU}$=0.5 kΩ, C=100 pF). The output voltage $V_{OUT}$ of the MR element was measured while step by step increasing the applied voltage $V_{APPY}$ by 1 V. The applied energy E [nJ] was calculated from the following equation (1);

$$E = Is_{PEAK}^2 \cdot R_{MR} \cdot \tau / 2 \qquad (1)$$

where $Is_{PEAK} = V_{APPY}/R$, $\tau = R \cdot C$ and $R = R_{SIMU} + R_{MR}$.

As will be apparent from FIG. 5, the inversion of the pinned direction is started when the energy of about 0.68 nJ is applied to the spin valve effect MR element, and finished when the applied energy increased to about 1.0 nJ. Thus, as aforementioned, the operating point for turning on the protection circuit 40 is defined to an energy level equal to or less than about 1.0 nJ, preferably to a level of about 0.68 nJ. As a result, when some electric charges are applied to the terminals of the MR element due to certain reason during manufacturing processes of the magnetic heads after forming the protection circuits 40, during assembling processes of the completed heads to the HDD or during practical operation of the HDD with the heads, the pinned direction inversion in the spin valve effect MR element can be surely prevented from occurring. Because the protection circuit 40 never respond to an energy level which will be applied thereto during usual use of the spin valve effect MR element, it results no problem to always connect this protection circuit 40 between the lead conductors of the MR element.

Figure 6:
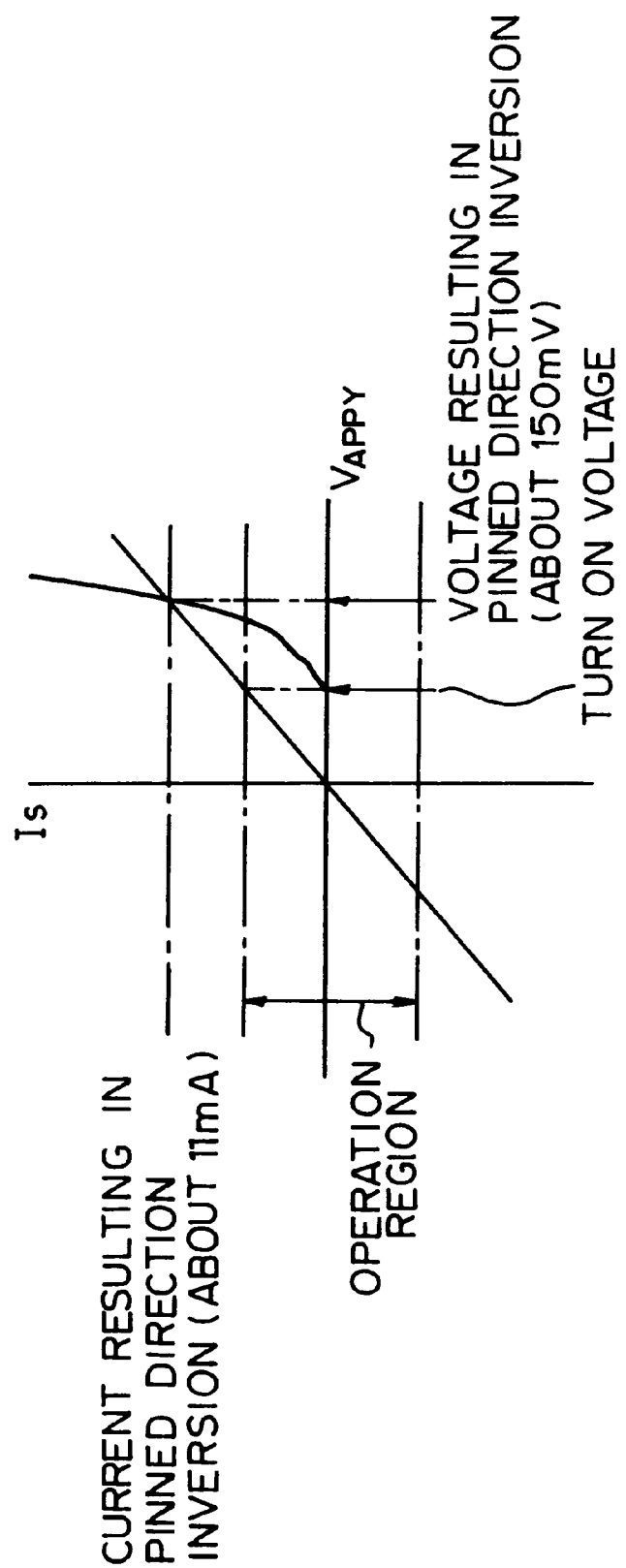
FIG. 6 illustrates an example of concrete characteristics of a Schottky diode.

FIG. 6 illustrates concrete characteristics of the Schottky diode 40a or 40b. Suppose that the spin valve effect MR element used has a track width of 1.5 μm and a MR throat height of 1.5 μm, and therefore its MR resistance $R_{MR}$ is about 14 Ω. The sense current during usual operation is about 4 mA and thus the applied voltage of the MR element is about 60 mV. When a current equal to or more than about 11 mA flows through this spin valve effect MR element in the against direction, its pinned direction will be inverted. Thus, it is required to prevent the current equal to or more than about 11 mA (under this current, the applied voltage will be about 150 mV) from flowing through the MR element. Each of the Schottky diodes 40a and 40b has characteristics shown in FIG. 6. which will satisfy the above-mentioned requirement.

With respect to another typical spin valve effect element with an initial $R_{MR}$ of 28.7 Ω, as for a modification of the aforementioned embodiment, an applied energy level at which its pinned direction is inverted is measured by experiment as follows.

Figure 7:
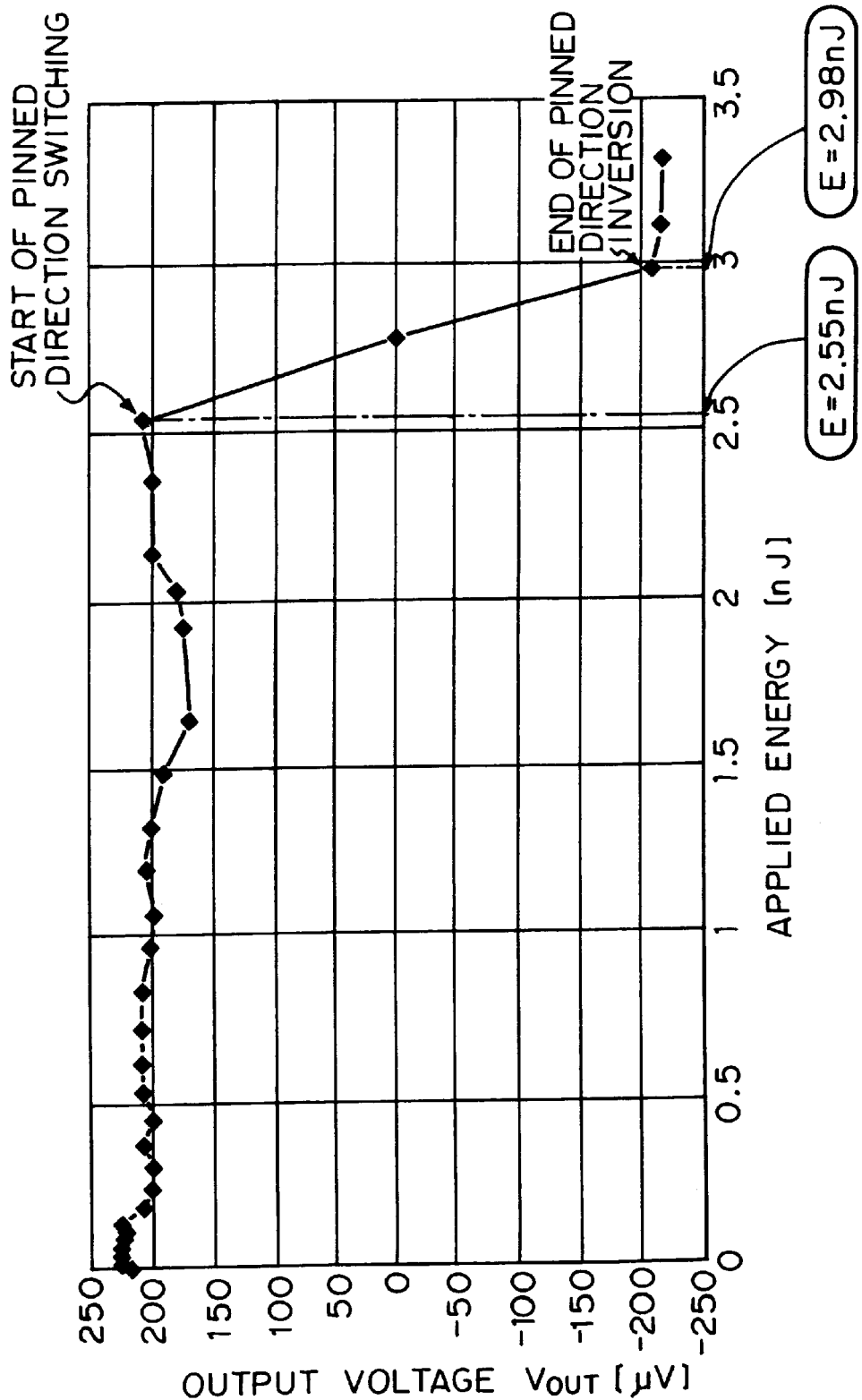
FIG. 7 illustrates applied energy level resulting in the pinned direction inversion with respect to another spin valve effect MR reading element.

(I) Initial state of this spin valve effect MR element is measured by applying external alternating magnetic field with a constant amplitude and a sense current with a constant value by means of a ρ-H tester. (II) Then, the spin valve effect MR element is attached to an ESD simulator after taking off it from the ρ-H tester, and a voltage of the against direction is applied from the ESD simulator to the MR element. (III) Thereafter, the MR element is taken off from the ESD simulator and attached to the ρ-H tester again. Then, characteristics of the MR element after applying the voltage is measured by applying external alternating magnetic field with a constant amplitude and a sense current with a constant value by means of the ρ-H tester. (IV) Thereafter, the above-mentioned processes of (II) and (III) are repeated with gradually increasing the applied voltage $V_{APPY}$ and with measuring the output voltage $V_{OUT}$ from the MR element. FIG. 7 shows the result of this experiment. In this figure, the axis of abscissas indicates the applied energy E [nJ] calculated by converting from the applied voltage $V_{APPY}$, and the axis of ordinates indicates the output voltage of the MR element $V_{OUT}$ [μV].

In the experiment, the external alternating magnetic field with a constant amplitude and the sense current of +4 mA in the against direction of the spin valve effect MR element were applied from the ρ-H tester. The voltage $V_{APPY}$ in the against direction of the spin valve effect MR element was applied from the ESD simulator which is a pseudo Human Body Model ($R_{SIMU}$=0.5 kΩ, C=100 pF). The output voltage $V_{OUT}$ of the MR element was measured while step by step increasing the applied voltage $V_{APPY}$ by 1 V. The applied energy E [nJ] was calculated from the aforementioned equation (1).

As will be apparent from FIG. 7, the inversion of the pinned direction is started when the energy of about 2.55 nJ is applied to the spin valve effect MR element, and finished when the applied energy increased to about 3.0 nJ, correctly 2.98 nJ. Thus, in this modification, the operating point for turning on the protection circuit is defined to an energy level equal to or less than about 3.0 nJ, preferably to a level of about 2.55 nJ. As a result, when some electric charges are applied to the terminals of the MR element due to certain reason during manufacturing processes of the magnetic heads after forming the protection circuits, during assembling processes of the completed heads to the HDD or during practical operation of the HDD with the heads, the pinned direction inversion in the spin valve effect MR element can be surely prevented from occurring. Because the protection circuit never respond to an energy level which will be applied thereto during usual use of the spin valve effect MR element, it results no problem to always connect this protection circuit between the lead conductors of the MR element.

Figure 8:
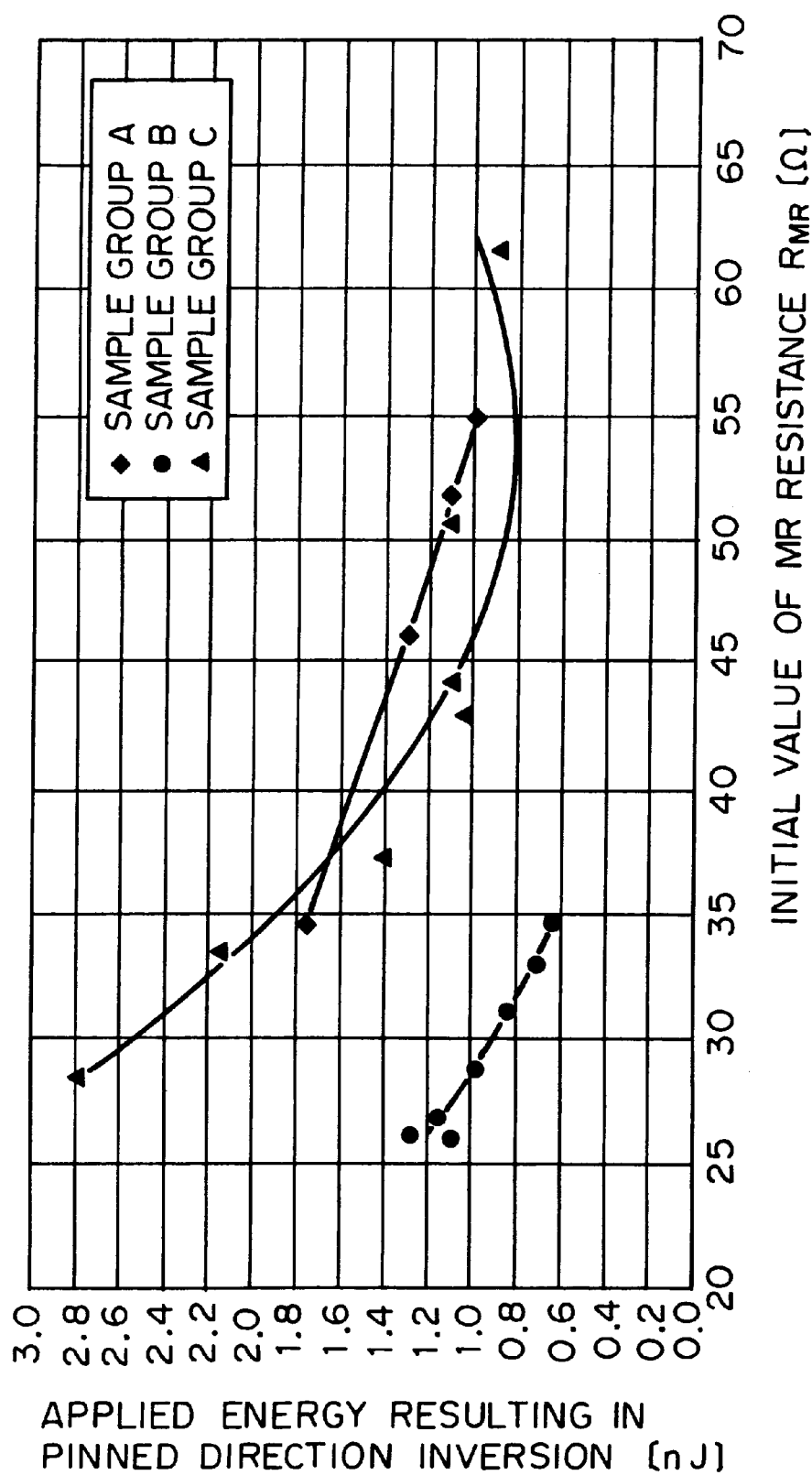
FIG. 8 illustrates applied energy level resulting in the pinned direction inversion with respect to spin valve effect MR reading elements with different initial MR resistances.

FIG. 8 shows experiment result of the applied energy level incurring the pinned direction inversion with respect to various spin valve effect MR elements with different initial MR resistances. In the figure, A, B and C denote sample groups of the spin valve effect MR element, which groups have different structures and shapes with each other. As will be understood from this figure, the applied energy introducing the pinned direction inversion differs depending upon the groups of the spin valve effect MR element and upon their initial MR resistances in each group. However, the pinned direction of any one of the spin valve effect MR elements is inverted when the energy of about 3.0 nJ is applied thereto.

It should be noted that the pinned direction inversion in the spin valve effect MR element occurs at the applied energy level lower than the applied energy level introducing the ESD destruction of the same MR element. Table 1 shows for ready comparison the applied energy resulting in the ESD destruction and the applied energy resulting in the pinned direction inversion with respect to a usual AMR element and a spin valve effect MR element. The applied energies E [nJ] are calculated from the equation (1) by using practically measured peak current value $Is_{PEAK}$ of the spin valve effect MR element and its half-value width τ. In the Table 1, the values inside the parentheses are calculated values using $Is_{PEAK}=V_{APPY}/R$, τ=R·C and R=$R_{SIMU}+R_{MR}$, and are relatively close to the measured values, respectively. As will be understood from Table 1, the energy level resulting in the pinned direction inversion in the spin valve effect MR element is extremely lower (substantially ¼ or less) than the energy level introducing the ESD destruction in the same MR element. Thus, it is impossible to prevent the pinned direction inversion in the spin valve effect MR element by means of the conventional ESD destruction protection technique.

TABLE 1

|  | ESD DESTRUCTION | | PINNED DIRECTION INVERSION |
|---|---|---|---|
|  | USUAL AMR ELEMENT | SPIN VALVE EFFECT MR ELEMENT | SPIN VALVE EFFECT MR ELEMENT |
| MR RESISTANCE $R_{MR}$ (Ω) | 45 | 45 | 44 |
| APPLIED VOLTAGE $V_{APPY}$ (V) | 40 | 33 | 18 |
| PEAK CURRENT $IS_{PEAK}$ (mA) | 85.5(73.4) | 70.0(60.6) | 37.0(33.1) |
| APPLIED ENERGY E (nJ) | 7.1(6.6) | 4.7(4.5) | 1.12(1.31) |

It is desired that the protection circuit 40, namely the Schottky diodes 40a and 40b is manufactured during the wafer process for forming a large number of magnetic heads on a substrate by using integration technique. FIG. 9 schematically illustrates a part of manufacturing processes of the magnetic head of the embodiment, particularly a part including a process for forming the protection circuit 40. In the wafer process, after a plurality of spin valve effect MR reading elements and inductive writing elements are fabricated, lead conductors and terminal electrodes (bumps) connected to each of the spin valve effect MR elements and the inductive elements are formed at step S91. Then, in the wafer process, a semiconductor film with Schottky junction, of P-type or N-type material such as Si, Ge, GaAs or InP, connected between a pair of the lead conductors of each spin valve effect MR element is formed by executing a semiconductor fabrication process at step S92. Then, after not shown processes for cutting the wafer into bars on which magnetic heads are aligned, for grinding the bars to adjust the throat height of the heads, for depositing a Diamond Like Carbon (DLC) layer on the bars, and for forming rails on the bars are executed, each bar is cut into slider pieces so as to obtain the separated magnetic heads at step S93.

In a modification of the embodiment shown in FIG. 3, the protection circuit 40 may be formed by connecting discrete Schottky diodes between a pair of the lead conductors of each spin valve effect MR element after the wafer process. FIG. 10 schematically illustrates a part of manufacturing processes of the magnetic head of this modification, particularly a part including a process for forming the protection circuit 40. In the wafer process, after a plurality of spin valve effect MR reading elements and inductive writing elements are fabricated, lead conductors and terminal electrodes (bumps) connected to each of the spin valve effect MR elements and the inductive elements are formed at step S101. Then, after completion of the wafer process, discrete Schottky diodes are in bidirectional connected between a pair of the lead conductors for the spin valve effect MR element of each the magnetic heads on the wafer, of each of the magnetic heads aligned on a bar obtained by cutting the wafer or of the separated magnetic head at step S102. If the magnetic head is already connected to the HDD by lead lines, the discrete Schottky diodes will be connected between the lead lines at any position from the magnetic head to the HDD. Preferably the forming or connection of the protection circuit is executed at the earliest time in the manufacturing process or in the assembling process of the magnetic head so as to provide a longer time period for protecting the pinned direction inversion.

In the aforementioned embodiment and its modifications, the Schottky diodes are utilized as for the protection circuit of magnetization inversion. However, the protection circuit of magnetization inversion can be formed by any switching element other than the Schottky diode so long as its turning on energy level is equal to or lower than about 3.0 nJ, preferably equal to about 0.68 nJ or about 2.55 nJ.

Figure 11:
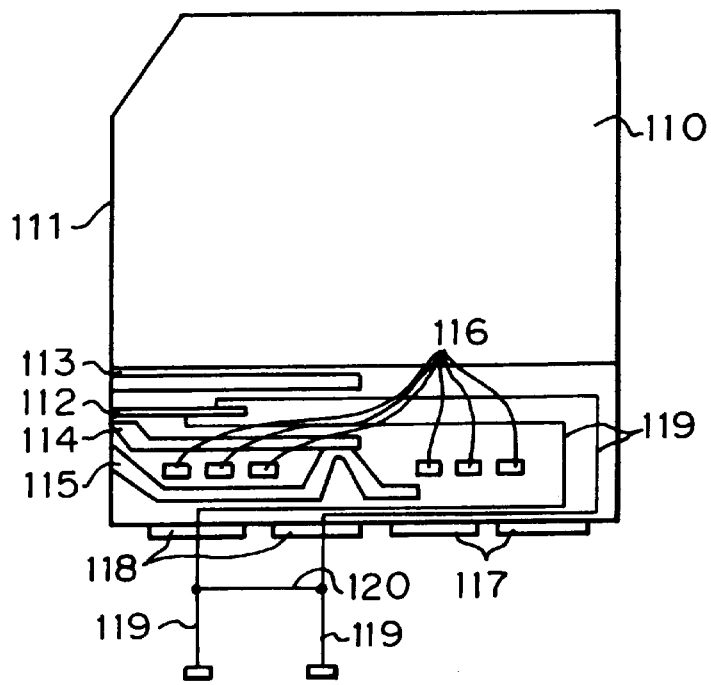
FIG. 11 shows a sectional view schematically illustrating another embodiment of a complex magnetic head with a spin valve effect MR element and an inductive element according to the present invention during its manufacturing processes.

FIG. 11 illustrates another embodiment of a complex magnetic head with a spin valve effect MR reading element and an inductive writing element according to the present invention during its manufacturing processes. In the figure, reference numeral 110 denotes a magnetic head slider, 111 denotes an ABS of the slider 110, 112 denotes the spin valve effect MR reading element, 113 denotes a lower magnetic shield layer for the MR reading element 112, 114 denotes a first thin-film magnetic core layer of the inductive writing element and an upper magnetic shield layer for the MR element 112, 115 denotes a second thin-film magnetic core layer of the inductive element, 116 denotes a coil of the inductive writing element, 117 denotes a pair of terminal electrodes for the inductive writing element, 118 denotes a pair of terminal electrodes for the MR reading element 112, and 119 denotes a pair of lead conductors connected across the MR reading element 112 and also with the pair of the terminal electrodes 118, respectively. In addition, according to this embodiment, an element (conductive line) 120 for short-circuiting the pair of conductive leads 119 so that the MR element 112 is short-circuited is provided during a part of the manufacturing processes.

Figure 12:
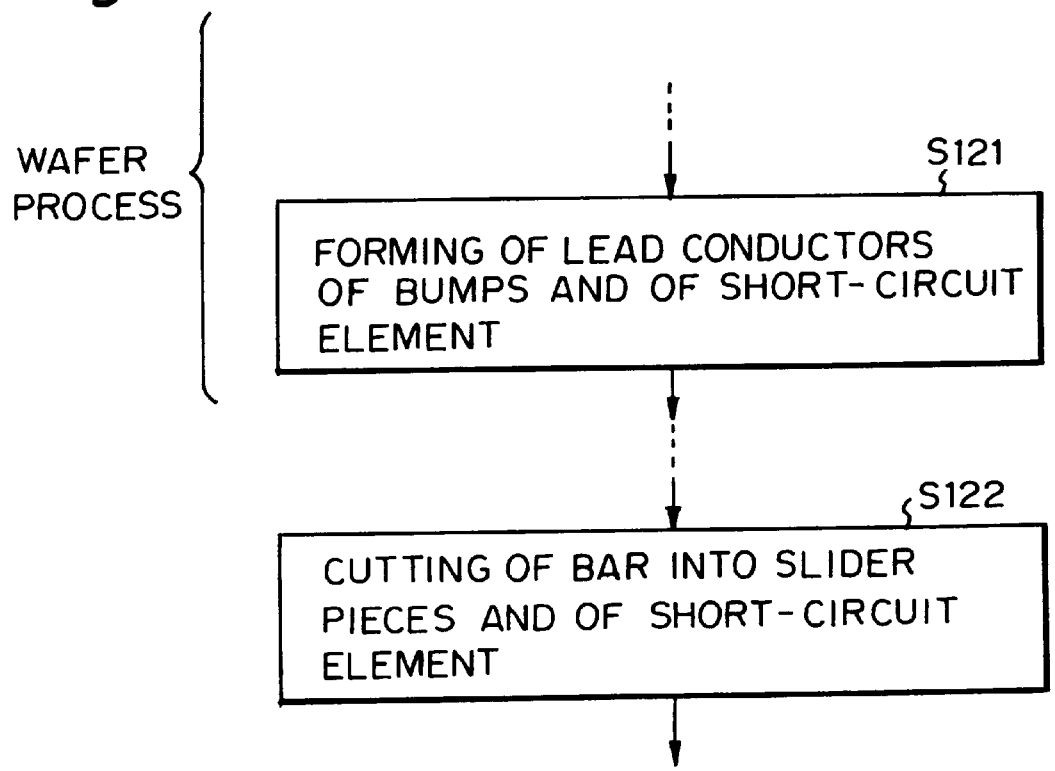
FIG. 12 shows a flow chart schematically illustrating a part of manufacturing processes of the magnetic head of the embodiment shown in FIG. 11, particularly a part including a process for forming a short-circuit means and cutting the element.
Figure 13A:
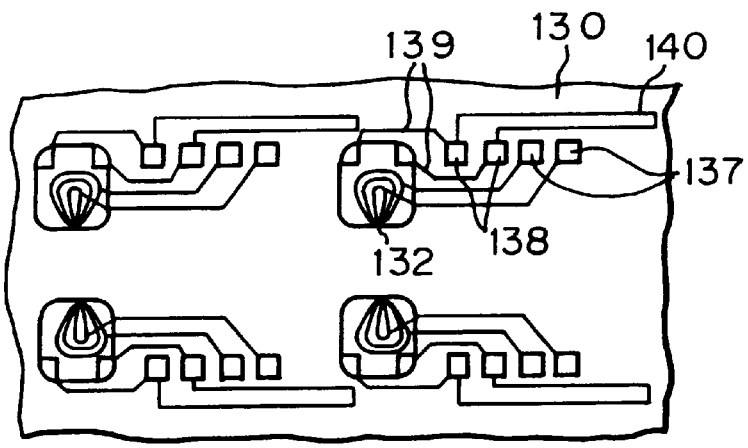
FIGS. 13a to 13c show side views illustrating a part of manufacturing processes of the magnetic head of the embodiment shown in FIG. 11, particularly a part including a process for forming the short-circuit means and cutting the element.
Figure 13B:
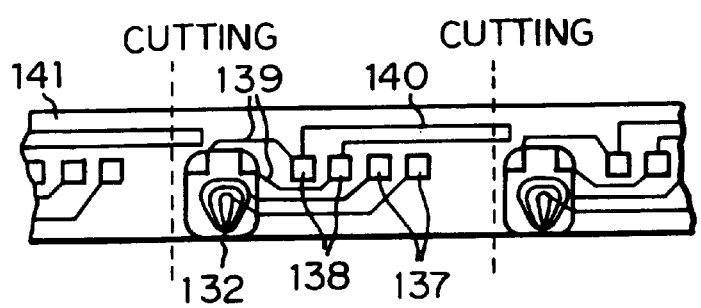
Figure 13C:
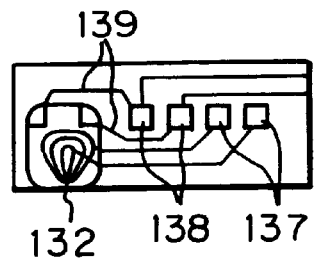

FIG. 12 shows a flow chart and FIGS. 13a to 13c show side views of the magnetic heads, for illustrating a part of manufacturing processes of the magnetic head, particularly a part including a process for forming a short-circuit means and cutting the element. In the wafer process, after a plurality of spin valve effect MR reading elements and inductive writing elements are fabricated, lead conductors and terminal electrodes (bumps) connected to each of the spin valve effect MR elements and the inductive elements are formed, and in addition, the short-circuit means (conductive line) 120 for short-circuiting the lead conductors for the spin valve effect MR element 112 is simultaneously formed at step S121.

In FIG. 13a, reference numeral 130 denotes the wafer (substrate), 132 denotes the spin valve effect MR element and inductive element part, 137 denotes the terminal electrodes for the inductive element, 138 denotes the terminal electrodes for the spin valve effect MR element, and 139 denotes the lead conductors for the spin valve effect MR element, respectively. The short-circuit means 140 is formed so as to short-circuit the pair of lead conductors 139 for the MR element or the terminal electrodes 138 for the MR element. Then, after processes for cutting the wafer into bars 141 on which magnetic heads are aligned, for grinding the bars 141 to adjust the throat height of the heads, for depositing a Diamond Like Carbon (DLC) layer on the bars 141, and for forming rails on the bars 141 are executed, each bar 141 is cut into slider pieces so as to obtain the separated magnetic heads at step S122. At this cutting process, the short-circuit means 140 are also cut and opened as shown in FIG. 13b. FIG. 13c represents the separated magnetic head after cutting.

As is described, in this embodiment, the short-circuit means 120 (140) is connected across the spin valve effect MR element. Thus, when some electric charges are applied to the terminals of the MR element due to certain reason during manufacturing processes of the magnetic heads until the short-circuit means is opened by cutting, the pinned direction inversion in the spin valve effect MR element can be surely prevented from occurring.

After cutting the short-circuit means, it is desired to connect an external short-circuit means described in Japanese unexamined patent publication 9(1997)-223304 (corresponding to U.S. patent application Ser. No. 08/797, 626 now pending) provided by the same applicant as this application with the lead conductors of the spin valve effect MR element.

Many widely different embodiments of the present invention may be constructed without departing from the spirit and scope of the present invention. It should be understood that the present invention is not limited to the specific embodiments described in the specification, except as defined in the appended claims.

What is claimed is:

1. A method of manufacturing a magnetic head with a spin valve effect magnetoresistive element, said method comprising the steps of:

forming a plurality of spin valve effect magnetoresistive elements on a substrate, each of said spin valve effect magnetoresistive elements including two ferromagnetic material layers separated by a non-magnetic material layer and an antiferromagnetic material layer formed in contact with one of said two ferromagnetic material layers;

forming a plurality of pairs of lead conductors connected with said respective spin valve effect magnetoresistive elements on said substrate; and forming a plurality of protection circuits of magnetization inversion connected between said respective pairs of lead conductors on said substrate, wherein the step of forming said plurality of protection circuits of magnetization inversion is performed so that each of said protection circuits of magnetization inversion turns on when said protection circuits receive an energy with a level at which a pinned direction inversion in each of said spin valve effect magnetoresistive elements occurs.

2. The method as claimed in claim 1, wherein said protection circuits forming step is performed so that each of said protection circuits of magnetization inversion has an operating point for turning on defined by an energy level substantially equal to or lower than 3.0 nJ.

3. The method as claimed in claim 2, wherein said protection circuits forming step is performed so that each of said protection circuits of magnetization inversion has an operating point for turning on defined by an energy level substantially equal to 2.55 nJ.

4. The method as claimed in claim 1, wherein said protection circuits forming step is performed so that each of said protection circuits of magnetization inversion has an operating point for turning on defined by an energy level substantially equal to or lower than 1.0 nJ.

5. The method as claimed in claim 4, wherein said protection circuits forming step is performed so that each of said protection circuits of magnetization inversion has an operating point for turning on defined by an energy level substantially equal to 0.68 nJ.

6. The method as claimed in claim 1, wherein said protection circuits of magnetization inversion forming step comprises a step of forming a plurality of Schottky diodes.

7. A method of manufacturing a magnetic head with a spin valve effect magnetoresistive element, said method comprising the steps of:

forming a plurality of spin valve effect magnetoresistive elements on a substrate, each of said spin valve effect magnetoresistive elements including two ferromagnetic material layers separated by a non-magnetic material layer and an antiferromagnetic material layer formed in contact with one of said two ferromagnetic material layers;

forming a plurality of pairs of lead conductors connected with said respective spin valve effect magnetoresistive elements on said substrate; and connecting a plurality of discrete protection circuits of magnetization inversion between said respective pairs of lead conductors on said substrate, wherein the step of connecting said plurality of discrete protection circuits of magnetization inversion is performed so that each of said discrete protection circuits of magnetization inversion turns on when said protection circuits receive an energy with a level at which a pinned direction inversion in each of said spin valve effect magnetoresistive elements occurs.

8. The method as claimed in claim 7, wherein said connecting step is performed so that each of said discrete protection circuits of magnetization inversion has an operating point for turning on defined by an energy level substantially equal to or lower than 3.0 nJ.

9. The method as claimed in claim 8, wherein said connecting step is performed so that each of said discrete protection circuits of magnetization inversion has an operating point for turning on defined by an energy level substantially equal to 2.55 nJ.

10. The method as claimed in claim 7, wherein said connecting step is performed so that each of said discrete protection circuits of magnetization inversion has an operating point for turning on defined by an energy level substantially equal to or lower than 1.0 nJ.

11. The method as claimed in claim 10, wherein said connecting step is performed so that each of said discrete protection circuits of magnetization inversion has an operating point for turning on defined by an energy level substantially equal to 0.68 nJ.

12. The method as claimed in claim 7, wherein said connecting step comprises a step of connecting a plurality of discrete Schottky diodes between said respective pairs of lead conductors.

13. A magnetic head with a spin valve effect magnetoresistive element, comprising:

a spin valve effect magnetoresistive element, including two ferromagnetic material layers separated by a non-magnetic material layer and an antiferromagnetic material layer formed in contact with one of said two ferromagnetic material layers;

a pair of lead conductors connected with said spin valve effect magnetoresistive element; and a protection circuit of magnetization inversion connected between said pair of lead conductors, said protection circuit being configured so as to turn on when said protection circuit receives an energy with a level at which a pinned direction inversion in said spin valve effect magnetoresistive element occurs.

14. The magnetic head as claimed in claim 13, wherein said protection circuit has an operating point for turning on defined by an energy level substantially equal to or lower than 3.0 nJ.

15. The magnetic head as claimed in claim 14, wherein said protection circuit has an operating point for turning on defined by an energy level substantially equal to 2.55 nJ.

16. The magnetic head as claimed in claim 13, wherein said protection circuit has an operating point for turning on defined by an energy level substantially equal to or lower than 1.0 nJ.

17. The magnetic head as claimed in claim 16, wherein said protection circuit has an operating point for turning on defined by an energy level substantially equal to 0.68 nJ.

18. The magnetic head as claimed in claim 13, wherein said protection circuit comprises a plurality of Schottky diodes.

* * * * *